May 26, 1936.   R. K. MORRIS   2,042,116
MECHANICAL MOVEMENT
Filed May 31, 1935   4 Sheets-Sheet 1

Inventor
Roy K. Morris,
By Smith, Michael & Gardner
Attorney

May 26, 1936.  R. K. MORRIS  2,042,116
MECHANICAL MOVEMENT
Filed May 31, 1935  4 Sheets-Sheet 2
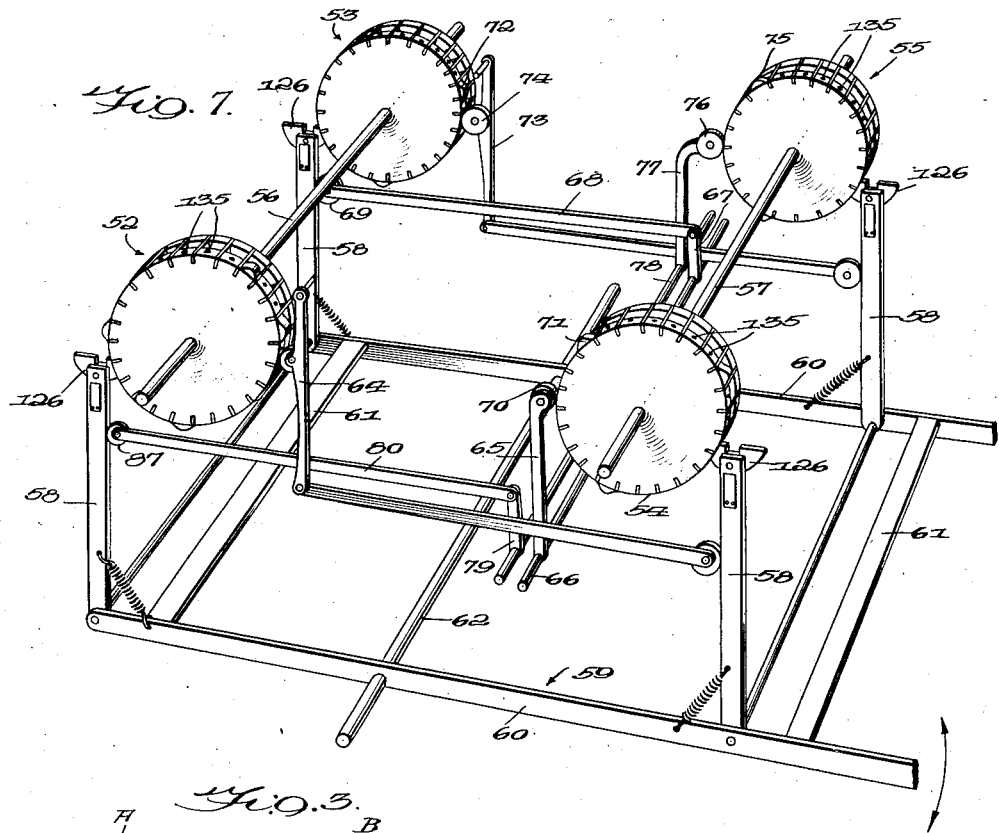
Inventor
Roy K. Morris,
By Smith, Michael & Gardner
Attorney

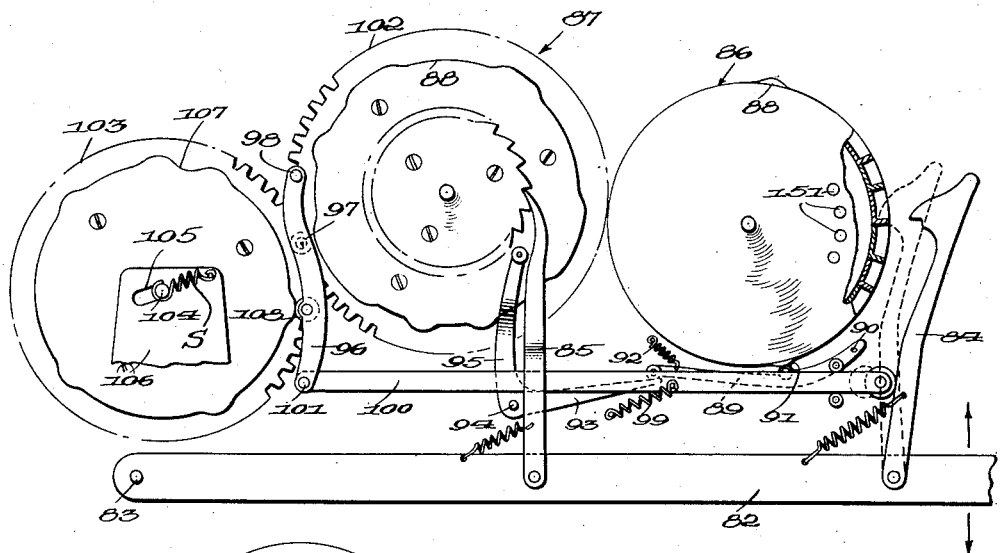
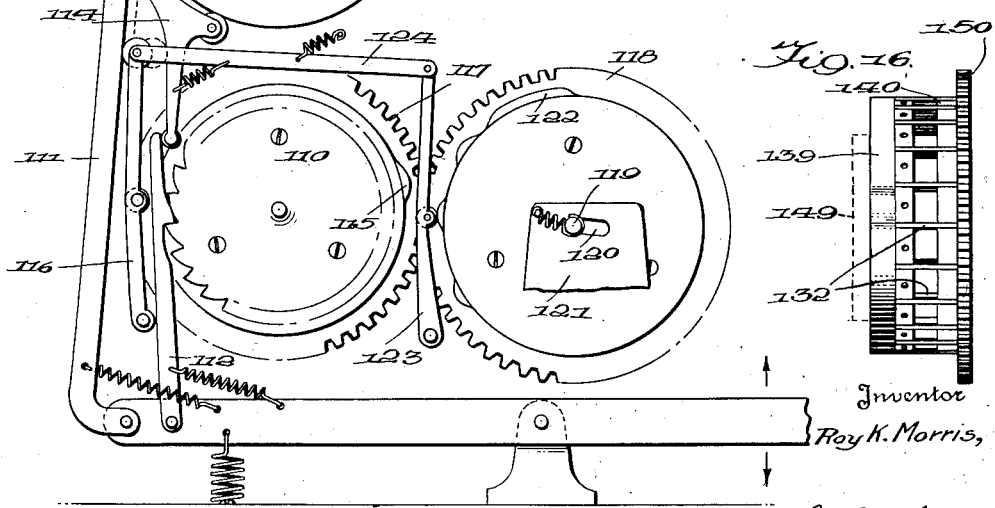

May 26, 1936. R. K. MORRIS 2,042,116
MECHANICAL MOVEMENT
Filed May 31, 1935  4 Sheets-Sheet 4
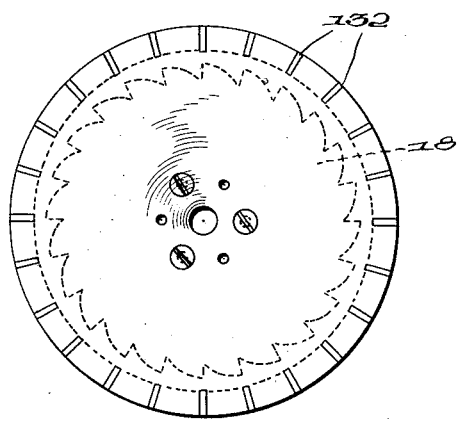
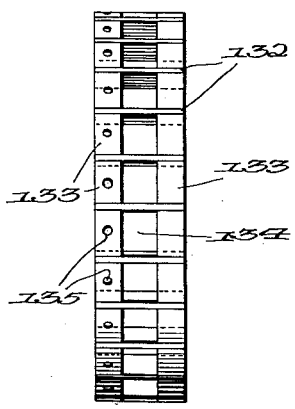
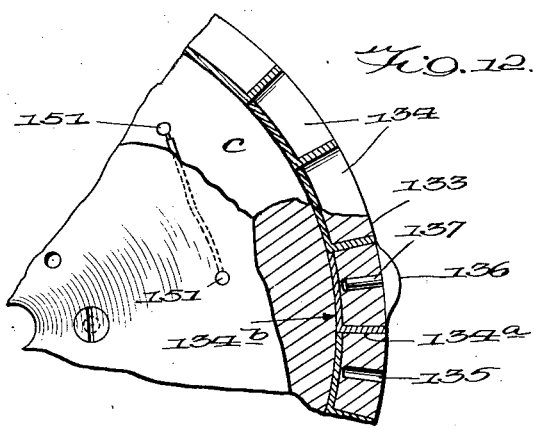
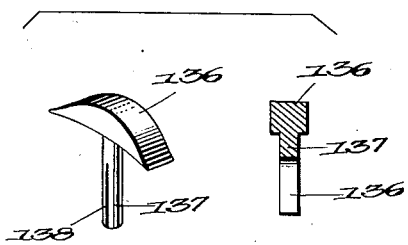
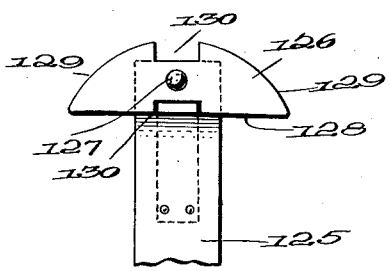
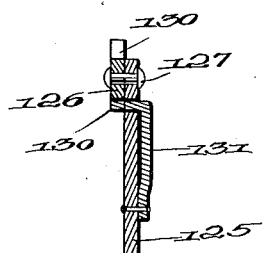
Inventor
Roy K. Morris,
By Smith, Michael & Gardiner
Attorney Patented May 26, 1936

2,042,116

UNITED STATES PATENT OFFICE 2,042,116

MECHANICAL MOVEMENT

Roy K. Morris, Charleston, W. Va.

Application May 31, 1935, Serial No. 24,398

17 Claims. (Cl. 74—143)

This invention is a motion transmitting and converting mechanism designed particularly for transmitting or converting reciprocatory or oscillatory motion of a driving element into intermittent rotary motion of one or more driven elements.

One object of the invention is to provide a mechanism of the character indicated whereby regular or uniform reciprocation or oscillation of one member may be converted into irregular intermittent rotary movement of one or more driven elements.

A further object of the invention is to provide in a mechanism of the character indicated, means for irregularly varying the relative position of a plurality of elements which are intermittently driven by a regularly or uniformly moving driving member. By the term "regular" or "uniform" as here used to characterize the motion of the driving element, is meant a motion which is uniform or regular with respect to cycles of movement in contradistinction to regularity of repetition of a given cycle. In other words, the movement of a driving element is regular or uniform within the meaning of these terms as here employed if said element moves always throughout a cycle comprising a given number of strokes or phases of movement, even though the periods of operation of the driven element are irregular or non-uniform. Thus the terms "regular" and "uniform" characterize the motion of the driving element with respect to complete cycles of movement without regard to the element of time.

Another object of the invention is to provide a mechanism of the character indicated wherein the driven elements may be intermittently rotated in either direction of rotation without changing the relative direction of movement of the driving element.

More specifically, the invention also contemplates the provision of a mechanism generally of the pawl and ratchet type wherein a plurality of toothed wheel elements may be intermittently driven by pawls and wherein at least one of the toothed wheel elements has associated therewith cam means moving in response to rotation of said toothed element and arranged to operate pawl control means associated with another toothed wheel element so that the relative rotations of said toothed wheel elements may be modified with respect to the driving element, and wherein the relative angular positions of said toothed elements may be irregularly varied with respect to a given fixed point, The invention also contemplates connecting one or more of the toothed wheel elements with other rotary cam carrying members operatively associated with a pawl control mechanism which is also arranged to be operated by cams associated with one of the toothed wheel elements, whereby a pawl for a given toothed wheel element may be controlled jointly by the intermittent rotation of another toothed wheel element and a cam carrying member driven thereby.

These and other objects of the invention will become apparent from the following specification, wherein has been disclosed various preferred modifications of the invention, the novel features of which have been more particularly pointed out in the appended claims.

In the accompanying drawings I have illustrated preferred embodiments of my invention wherein:

Figs. 3, 4, 5 and 6 show diagrammatically different arrangements employing four driven elements and the manner in which the individual driven elements may be connected to control the driving pawls of other driven elements.

Fig. 7 is a perspective view of the arrangement shown in Fig. 6 employing four driven elements arranged in pairs, one behind the other, each operating a pawl control or throw-out mechanism associated with a different wheel element.

Fig. 8 is an end elevation partly in section of a modified form of the arrangement shown in Fig. 2.

Fig. 9 is a further modification of the apparatus as shown in Fig. 8.

Fig. 10 is a side elevation of a preferred form of toothed wheel element.

Fig. 11 is a front elevation of the wheel shown in Fig. 10.

Fig. 12 is a detail view partly in section of a toothed wheel element showing an adjustable cam member associated therewith.

Fig. 13 is a detail view of an adjustable or removable cam member for a toothed wheel element.

Fig. 14 is a fragmental elevation of a reversible head for a driving pawl.

Fig. 15 is a sectional view taken on the line 15—15 of Fig. 14 showing locking means for the reversible pawl head.

Fig. 16 is a front elevation of a modified toothed wheel element carrying a plate cam.

Fig. 17 is a diagrammatic view of the arrangement of pawls and throw-out mechanism adapted to the arrangements shown in Figs. 3, 4, and 5.

Figure 1:
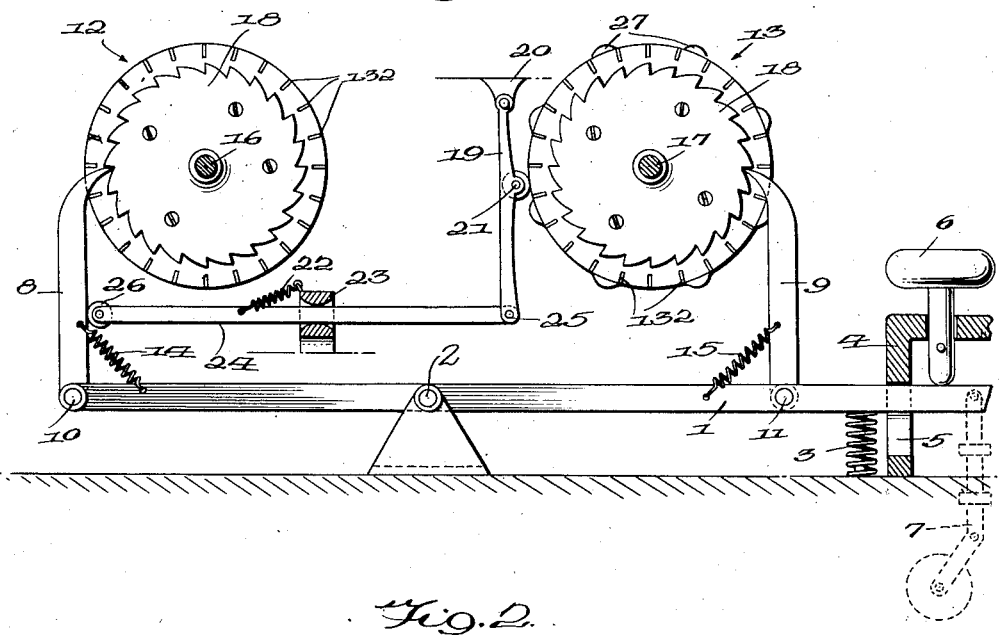
Figure 1 is an end elevation partly in section showing a simple form of my invention wherein two driven elements are intermittently operated from a single drive, and wherein one of the driven elements is arranged to actuate pawl control mechanism associated with the other driven element.

Referring more particularly to the accompanying drawings wherein like reference numerals are used to designate like parts throughout, Fig. 1 shows one of the simpler forms of my invention wherein an oscillating lever 1 is pivoted intermediate its ends at 2, said lever being biased to the position in which it is shown by a spring member 3 and an associated stop 4. The stop member 4 is slotted as at 5 to permit the lever 1 to oscillate about the pivot 2 when depressed under the influence of a plunger 6, and to return to the position shown under the influence of the spring 3. The plunger 6 may be operated manually or in any desired manner, or the plunger 6 may be replaced by any desired power means such as the pitman mechanism illustrated at 7 in dotted lines.

The oscillatable lever 1 is arranged to carry driving pawls 8 and 9, the latter being pivotally connected to the lever at points 10 and 11, respectively. The pawl members 8 and 9 are held into operative engagement with a pair of toothed wheel elements 12 and 13, respectively, by tension springs 14 and 15. The toothed wheel elements 12 and 13 are mounted for rotation upon shafts 16 and 17, respectively, said shafts being in the present arrangement supported in any convenient manner above the lever 1 and being disposed substantially parallel to each other and the pivot point 2 of said lever.

Each of the wheel elements 12 and 13 includes a suitable ratchet or toothed portion 18 with which the respective pawls 8 and 9 cooperate to intermittently drive the wheel members when the lever 1 is oscillated. The toothed portion 18 may take the form of a plate-like member secured to one side of the wheel member as shown in full lines in Figs. 1 and 2 and in dotted lines in Fig. 16, or the wheel element may carry peripheral tooth members as shown more clearly in Figs. 7, 10, and 11. The latter form, as hereinafter pointed out, has certain advantages in arrangements wherein it is desirable to reverse the direction of rotation of the wheel elements, but it is obvious that the side plate arrangement is also adapted for use in reversible units by providing the same with straight radial teeth instead of the conventional ratchet teeth as shown.

As thus far described it is apparent that as the lever 1 is moved to its lowermost position in the guide slot 5 and then allowed to assume the position in which it is shown in Fig. 1 under the influence of the spring 3, the driving pawl 8 will impart a power impulse to the toothed wheel 12 on the down stroke of the right hand end of the lever 1, whereas on the up stroke of said lever the pawl 9 will similarly advance the wheel 13, thus regularly advancing the respective wheel elements one step each for each complete cycle of movement of the lever 1. By way of explanation, a cycle of movement of the lever 1 includes a down stroke and an up stroke or a depression from the position in which it is shown in Fig. 1 and a return to this position.

In order to modify and render irregular the relative movement of the wheel elements 12 and 13, I provide pawl control or throw-out mechanism such as shown associated with the wheel 13 in Fig. 1. This mechanism includes a lever 19 pivoted at a fixed point 20 adjacent the periphery of the wheel element 13, said lever 19 carrying intermediate its ends a roller 21 urged against the periphery of the wheel member 13 by a spring member 22 connected with a fixed guide member 23 and a link 24, said link being supported by said guide member 23 and connected at one end to the free end of the lever 19 as at the point 25. The opposite end of the link 24 carries a roller 26 which bears against the driving pawl 8 associated with the toothed wheel 12. In order to intermittently move or rock the lever 19 about its pivot 20 I associate with the wheel element 13 in any desired manner, one or more cam members 27 positioned to rock the lever 19 when rotated into engagement with the roller 21 carried thereby. Thus, as the toothed wheel 13 is advanced step by step under the action of the driving pawl 9, the cam members 27 successively engage the roller 21 to rock the lever 19, whereupon the link 24 is reciprocated in the guide member 23 to move the driving pawl 8 associated with the toothed wheel element 12 out of engagement with the ratchet teeth 18 thereof. By this arrangement it will be seen that the intermittent movement of the wheel 12 with respect to the lever 1 is modified or rendered irregular, whereas the intermittent movement of the wheel 13 continues in a regular and uniform manner, getting one driving impulse for each cycle of movement of the lever 1. It is apparent that by this construction the pawl control or throw-out mechanism which I have shown associated with the wheel 13 for periodically moving the pawl of the driving wheel 12 out of engagement therewith, functions to interrupt the movement of wheel 12 so long as one of the cams 27 is in engagement with the roller 21. Obviously, by arranging the cams 27 in any desired manner, a predetermined modification of the movement of wheel 12 may be provided. With this in mind my invention contemplates means for adjustably mounting the cam members 26 upon the respective toothed wheel elements and this phase of the invention will be described later in detail.

Also my invention comprehends the possibility of associating plate cams with the wheel members, as suggested in Fig. 16. In this modification a wheel and cam is made as a unit designed to impart a predetermined movement to a given wheel element, the pawl of which is controlled by the cam of said unit. By making these units interchangeable a desired unit may be readily inserted or substituted when desired.

Figure 2:
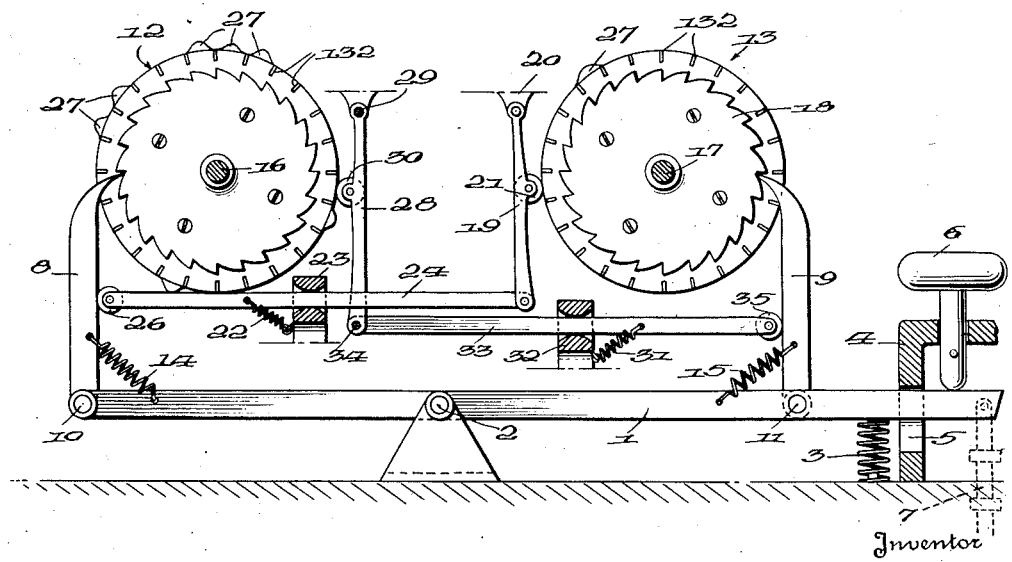
Fig. 2 is a view similar to Fig. 1 showing both driven elements arranged to actuate pawl control or throw-out mechanism.

Referring to Fig. 2, I have shown a modification of the arrangement just described in connection with Fig. 1, the arrangement in Fig. 2 including means for modifying the movement of both wheels with respect to the oscillating driving lever 1. Generally, the arrangement shown in Fig. 2 corresponds to that shown in Fig. 1, but includes a second pawl control or throw-out mechanism, this second pawl control mechanism being shown associated with the toothed wheel 12. Thus, in Fig. 2 a lever 28 corresponding to the lever 19 of Fig. 1 is shown pivoted at a point 29 and as carrying intermediate its ends a roller 30 which bears against the periphery of the toothed wheel 12 under the influence of a spring 31 connected between the guide 32 and the link member 33, the latter having one end connected to the free end of the lever 28 as at 34, while its opposite end carries a roller 35 and bears against the driving pawl 9, which pawl is associated with the toothed wheel 13. Furthermore, the toothed wheel 12 has associated therewith one or more cam members 27 for engaging the roller 30 to rock the lever 28 to periodically throw out the pawl member 9 to stop movement of the wheel 13. Thus it will be seen that by providing pawl control or throw-out mechanism with both toothed wheel elements 12 and 13 and respectively arranged to throw out the driving pawl associated with the other wheel element, I provide simple and effective means for modifying the advance movement of both toothed elements in a highly irregular manner. The particular movement of either wheel may be controlled as desired by positioning the respective cam points in accordance with a predetermined pattern and this not only modifies the movement of each wheel with respect to the oscillating lever 1, but also relatively and irregularly changes the position of the wheels with respect to each other.

As thus far disclosed it is apparent that my invention contemplates intermittently driving a pair of toothed wheel elements by means of a regularly oscillating or reciprocating member and controlling the driving pawl of one wheel by means associated with and responsive to movement of the other toothed wheel member. My invention further contemplates the multiplication of the simple unit shown in either Fig. 1 or Fig. 2 into any desired number of pairs of toothed elements each having associated therewith a driving pawl and having selected wheel elements provided with pawl control or throw-out mechanism for other toothed wheel members of the unit. In so modifying and multiplying the number of toothed elements in a given unit it is necessary only to associate the driving pawl mechanism therewith in a manner such that one-half of the toothed wheel members are arranged to be driven on one-half of the cycle of movement of the driving lever, whereas the remaining half of the toothed wheel elements shall be arranged to be driven on the other half of the cycle of movement of the driving member. With this in mind I have shown diagrammatically in Figs. 3, 4, 5, and 6 several desired arrangements of units including four toothed wheel elements each. It is obvious from the illustrations and discussion, however, that it is within the scope of my invention to employ six, eight, ten or more wheels as desired without departing from the spirit of my invention.

Referring to Fig. 3, the toothed wheel elements are represented diagrammatically at 36, 37, 38 and 39. In the arrangement shown these elements are designed to be mounted for rotation on a single shaft and have the driving pawls associated therewith in a manner such that the wheel elements 36 and 38 will be given a power impulse of one stroke of the cycle of operation, whereas the wheel members 37 and 39 will be arranged to be driven by their respective pawls on the second half of the cycle of movement of the driving lever. The arrangement and manner of operation of the driving pawls is indicated diagrammatically by the brackets A and B. The pawl control mechanism of this unit is shown diagrammatically by the lead lines carrying the arrow heads, said lines indicating that the wheel from which the lead line emanates carries cam members which control the driving pawl of the wheel to which the arrow head points. Thus the lead line 40 indicates that the toothed wheel element 36 is provided with one or more cam members similar to those shown at 27 in Figs. 1 and 2, and that said cam members cooperate with levers similar to those shown at 19 for the purpose of controlling suitable linkage to throw out the driving pawl associated with the toothed wheel element 37. Similarly, the lead line 41 indicates that the toothed wheel 39 is provided with cam members arranged to operate pawl throw-out mechanism associated with the toothed wheel 38. In the diagram shown in Fig. 3 it will be noted that the modification of the movement of successive wheels is arranged in a manner such that the modification progresses in a circular series so that the resulting irregularities in relative movement between the individual wheels and the driving lever and the irregularities in relative positions assumed by the several wheels is of a very high order.

Referring to Fig. 4, the sequence of operation of the wheels has been modified so that the two outside wheel members 42 and 45 are advanced on one stroke of the cycle of the driving lever, whereas the two inside wheels 43 and 44 are advanced on the succeeding stroke of the cycle. Also, the direction of progression or modification of movement of the respective wheels has been reversed as indicated by the lead lines 46.

A further illustration of the possibilities of modifying the relative movements and positions of the several toothed elements is shown in Fig. 5, whereas wheels 47 and 48 are operated on one stroke of the cycle, whereas wheels 49 and 50 are operated on the other stroke of the cycle. Note here also that the progression of modification of wheel movement is rendered more complex by arranging the pawl throw-out mechanism as indicated by the lead lines 51.

In Fig. 17 I have shown diagrammatically a preferred arrangement of driving pawls and throw-out levers for controlling the same, which arrangement is adapted for any of the modifications shown in Figs. 3, 4, and 5 wherein the toothed wheel elements are mounted on the same axis. In this figure the oscillating pawl driving lever, which is in the form of a frame similar to that shown in Fig. 7, is indicated by the reference character 141, the same being pivoted as at 142 and carrying at one end the driving pawls 143 operatively associated with the toothed wheel elements 144. The pawl throw-out levers are represented at 145 and are connected to exert a pull on the links 146 when engaged by the cam members 147. The link members 146 are arranged to operate upon extensions 148 of the pawl members which extend below the pivot points thereof so that a pulling force exerted on said extension by the links 146 will remove the driving pawls from engagement with their respective toothed elements. This arrangement is applicable to a construction wherein all of the driving pawls are arranged on the same side of the axis of rotation of the wheel members. It will be understood in connection with the arrangement shown in Fig. 17 that the pawl 143 is operating upon the teeth of a wheel member 144 located in a plane behind the wheel member carrying the cams 147, which cams cooperate with the lever 145. In this connection it is to be observed that, due to the fact that one-half of the driving pawls operate on the up stroke of the lever 141 and the other half thereof on the down stroke of the lever, the pawls must be arranged to "push" or to "pull" in accordance with the direction of their respective power or impulse strokes (see pawls of Figs. 9 and 10). Obviously, this construction can be modified to accommodate an arrangement where the pawls of opposite pairs of driven wheels are arranged on opposite sides of the axis of rotation in a manner suggested by Fig. 7, in which instance, the pawls may all be either "pushing" pawls or "pulling" pawls, as desired.

Fig. 6 shows a further diagrammatic illustration of the manner in which a four wheel unit may be arranged, this arrangement contemplating positioning the wheels of each pair on a separate shaft or axis and having the shafts arranged parallel to each other. In order to give a specific example of this arrangement reference may be had to Fig. 7 wherein the toothed wheel elements are indicated by the reference characters 52, 53, 54 and 55. The toothed elements 52 and 53 are mounted for rotation upon a fixed shaft 56 whereas the wheels 54 and 55 are mounted upon a parallel shaft 57. Associated with each toothed wheel is a driving pawl 58. The driving pawls are all operatively and pivotally carried by a frame 59, said frame comprising the side bars 60 and cross-connecting bars 61. The frame 59 is mounted for oscillation upon the shaft 62 so that as the right hand end of the frame viewed in Fig. 7 is depressed, the pawl members 58 associated respectively with wheels 52 and 53 impart a driving impulse thereto, whereas when the frame raises under the influence of a spring such as shown at 3 in Figs. 1 and 2, the driving pawls 58 associated with the wheels 54 and 55 will impart a driving impulse to their respective toothed wheels (provided the pawl throw-out mechanism is not at the moment operative to move any one of the pawls from their respective wheels).

For modifying the relative movement and position of the several wheels in a manner such as indicated by the lead lines 63 of Fig. 6, the toothed element 52 has associated therewith a pawl throw-out mechanism indicated generally by the reference character 64 arranged to control or periodically disengage the driving pawl 58 associated with the toothed wheel member 54. In turn the wheel member 54 has associated therewith a pawl control or throw-out mechanism arranged to control the driving pawl of the wheel 53. This control mechanism includes a lever 65 carried by a rock shaft 66, said rock shaft carrying an arm 67 to the free end of which is connected a link 68 carrying at its free end a roller 69 which bears upon the driving pawl 58 associated with wheel 53 for the purpose of moving it away from the toothed periphery of said wheel when the roller 70 carried by the lever 65 engages a cam member 71 associated with the toothed wheel member 54. Similarly, the toothed wheel 53 carries cam members 72 arranged to operate a pawl control mechanism 73 associated with the wheel 53 in a manner to throw out the pawl member 58 associated with the toothed wheel 55 upon engagement of a cam 72 with the roller 74 carried by the pawl control mechanism 73. The wheel 55 in turn controls the driving pawl for the wheel 52 by means of cam members 75 operatively engaging roller 76 carried by the lever 77 affixed to the cross shaft 78, which shaft carries an arm 79 connected to a link 80, the latter carrying a roller 81 and bearing against the driving pawl 58 of wheel 52 in a manner to move it from engagement with the teeth thereof when one of the cams 75 of wheel 55 operatively engages the roller 76 of lever 77. Thus, it will be seen that the progression of modification of the wheels of this unit is as shown by the lead line 63 in Fig. 9.

My invention further contemplates means for additionally modifying or rendering more irregular the movement of one or more wheels of a given unit by connecting one or more of the toothed elements of a given unit to drive a second cam unit and having the second cam unit positioned to operate the same pawl control or throw-out mechanism which is operated by the cams on the toothed element which drives the cam member. Two modifications of this phase of my invention are shown in Figs. 8 and 9. Referring to Fig. 8, the lever 82 is pivoted at a point 83 and arranged to be oscillated thereabout by any convenient means such as shown by the reference characters 6 or 7 in Figs. 1 and 2. The lever 82 carries a plurality of pawl members 84 and 85 arranged to operatively engage the teeth provided upon wheel elements 86 and 87. Each of the toothed elements 86 and 87 is provided with cam means 88 including any desired number of cam points. Associated with each cam means is a pawl control or throw-out mechanism. The pawl control mechanism associated with the wheel 86 comprises a lever 89 pivoted at one end as at 90 and carrying a roller 91 biased toward the points of cam member 88 of the wheel 86 under the influence of a spring 92. The free end of the lever 89 bears upon one end of a bell crank lever 93 pivoted at 94 and having an arm 95 in engagement with the driving pawl 85 of the wheel 87. Thus, as the points of cam 88 of wheel 86 engage the roller 91 the levers 89 and 93 are rocked to move the driving pawl 85 out of engagement with the teeth of wheel 87. Similarly, the wheel 87 is provided with control mechanism for the driving pawl 84 of the wheel 86, said control mechanism including a lever 96 pivoted intermediate its ends at a point 97 and carrying at the upper end thereof a roller 98 engageable with the cam 88 of the gear wheel 87. The roller 85 is urged toward the cam 88 of wheel 87 by means of spring 99 attached to the link 100, said link being connected at one end to an end 101 of the lever 96 and bearing at its opposite end upon driving pawl 84 of wheel 86. Thus, as the points of cam 88 of wheel 87 engage the roller 98, the lever 96 is rocked to urge the link 100 in a direction to move the pawl 88 out of engagement with the teeth of the wheel 86.

The wheel 87 is further provided with a gear member 102 which meshes with a second gear element 103, the latter mounted for rotation about a shaft 104 laterally slidable in a slot 105 of a bearing member 106. The gear member 103 has associated therewith cam means 107 carrying points with which engage a roller 108 carried by the lever 96 on the opposite side of the pivot 97 thereof with respect to roller 98. It is thus seen that both the points of cam 88 of wheel 87 and of cam 107 of gear 103 are operative to rock the lever 96 about its pivot to throw out the driving pawl 84 of the wheel 86. Thus, the movement of the wheel 86 is rendered highly irregular due to the combined action of the points on the cams of the members 87 and 103 in controlling the operative position of the driving pawl thereof. The flexibility of modification of relative movement and position of the members 86 and 87 is further enhanced by the slotted bearing for the shaft of wheel 103 by which the gear teeth thereof may be demeshed from the teeth 102 of wheel 87 and the wheel 103 shifted slightly to vary the order in which the respective cams on the elements 107 and 88 operate upon the lever 96 to cause disengagement of the driving pawl 85 of the wheel 86. A spring member S is provided to maintain the wheel 103 normally in proper driving relation with the wheel 87.

A modified arrangement of an otherwise similar unit is shown in Fig. 9 wherein the toothed wheel members 109 and 110 are arranged to be driven by pawl members 111 and 112, respectively. The member 109 is provided with cam means 113 with which cooperates a pawl throw-out mechanism 114 operatively associated with the driving pawl 112 and the toothed wheel 110. Similarly, the toothed wheel 110 is provided with cam means 115 with which a pawl throw-out mechanism 116 cooperates, the latter being arranged to disengage driving pawl 111 from the teeth of wheel 109. The toothed wheel member 110 is provided with a gear 117 which meshes with a gear wheel 118 mounted for rotation upon a shaft 119 slidably mounted within a slot 120 carried by a bearing member 121. The gear member 118 carries cam members 122 which operatively engage a pivoted lever 123 which, through linkage 124, is effective to disengage driving pawl 111 from operative engagement with the wheel 109. Thus, here, as in the apparatus shown in Fig. 8, one of the toothed wheel members which is intermittently driven by pawl members operated by an oscillating lever, is arranged to drive a cam carrying member not directly connected with the pawl and ratchet mechanism but having cam means arranged to control jointly with the cams of one of said toothed wheel elements, the driving pawl of the other of said toothed wheel elements.

It will be understood by considering the various arrangements of driving levers, driving pawls and pawl control means, as disclosed in the several figures thus far described, that my invention is applicable to all forms of pivoted levers carrying driving pawls for associated toothed wheel elements irrespective of the position of the pivot about which the driving lever is oscillated and/or the position of the driving pawls with reference to said pivot, or to the axis of rotation of the wheel members. Thus, as shown in Figs. 1 and 2, the driving lever may be pivoted intermediate its ends and may have the driving pawls associated therewith in a manner such that each pawl operates as a pushing pawl. In Fig. 8 the driving lever is pivoted at one of its ends and one of the pawls is arranged as a pulling pawl, whereas the other is arranged as a pushing pawl. This same arrangement of pawls with reference to the direction of their action is shown in Fig. 9 but wherein the lever is pivoted intermediate its ends and the pawls are both carried on one side of said pivot, and on the same side of the axis of rotation of the wheels.

In view of the various mechanical arrangements of the driving lever and pawls with respect to their being pushing or pulling pawls, I have found it desirable to provide means for reversing the action of a given pawl, namely, to change it from a pushing pawl to a pulling pawl or vice versa when desired. This phase of my invention is shown in detail in Figs. 14 and 15 wherein 125 represents the upper portion of any one of the driving pawls such as shown in Figs. 1, 2, 7, 8, 9, and 17, or 58 in Fig. 7. Upon the upper end of such pawl member I provide an adjustable head 126 the same being pivoted substantially centrally thereof as at 127. The head 126 has wing portions which extend laterally on opposite sides of the member 125, as clearly shown in Fig. 14, said wing portions being connected on one side of the pivot by a substantially straight edge 128 whereas on the other side of said pivot the wing portions are connected by arcuate or curved portions 129. Intermediate the wing portions on both the straight edge 128 and the arcuate portion 129 I provide recesses 130 with which cooperates a spring latch member 131, as clearly shown in Fig. 15. Thus, by withdrawing the latch member 131 from the locking recess 130 the head 126 may be rotated into a position to reverse the position of the straight driving edge 128 of the pawl head. Thus, as shown in Fig. 14, the driving edge is arranged to impart a pulling stroke, whereas if the head is rotated 180° the edge 128 becomes a pushing edge for the pawl.

It is apparent that the conventional ratchet teeth such as shown associated with the toothed wheel elements 12 and 13 of Figs. 1 and 2 are capable of receiving a power impulse during a pushing stroke only. Having in mind the desirability of reversing the direction of rotation of the toothed wheel elements, by means of the reversible pawl head shown in Figs. 14 and 15, I contemplate employing toothed wheel elements capable of being advanced by either a "pushing" or a "pulling" stroke. Such a wheel I have shown in Figs. 10 and 11 wherein the teeth are defined by radially extending cross bars 132. These cross bars are arranged to extend across an annular recess defined by spaced rim sections 133, carried by a pair of opposed discs secured together as shown in Figs. 10, 11 and 12. The cross bars 132 are preferably L shaped in cross-section, the vertical leg thereof being seated in kerfs 134ᵃ provided in the rim members 133, and the horizontal leg of the bars being received in complemental annular groove 134ᵇ provided on the inner faces of said rim sections. Preferably the cross bars are dimensioned so as to maintain the opposed disc members in slightly spaced relation to provide a cavity c within the wheel within which to dispose electric wiring connections between desired contacts 151 shown in Figs. 8 and 9, the purpose of which is hereinafter explained. Thus the cross bars provide tooth members separated by peripheral pockets 134 in which the respective driving pawls may enter. The exposed portions of the horizontal legs of the cross bars visible within said pockets may conveniently carry desired indicia whereby the relative position of the several wheel members of a unit may be compared or determined. This feature is desirable in the application of this invention to cryptographic work, referred to hereinafter.

It is at once obvious that toothed wheel members such as shown in Figs. 10 and 11 may be advanced intermittently with equal facility whether the pawl be arranged to impart a driving impulse thereto by a pushing or a pulling stroke. In either instance, during the retrograde or non-power stroke of the pawl, the arcuate edge 129 would ride over the tooth edges without imparting an impulse to the wheel, while on the opposite stroke the straight edge portion 128 will operatively engage a flat face of the tooth to impart a driving impulse to the wheel. I have shown in Fig. 7 the driving pawls 58 provided with reversible heads such as shown in Figs. 14 and 15 so that all of the wheel elements may be driven in either direction as desired.

It is obvious that this type of toothed wheel member while being of particular advantage in instances wherein it is desirable to operate the wheels in either direction by means such as I show in Figs. 14 and 15, said wheels are likewise adapted to be driven by convenentional pawls, either "pushing" or "pulling". Thus, in Fig. 8 I show a pulling pawl 84 driving the wheel 86 and in Fig. 9 a pushing pawl 111 driving the toothed wheel 109.

As hereinabove suggested, I contemplate providing the toothed wheel elements with removable and/or adjustable cam members for the purpose of changing the character of intermittent motion imparted to the wheels through the instrumentality of the cam controlled pawl throw-out mechanism. One means of accomplishing this I have illustrated in Figs. 12 and 13, wherein one or both rim sections 133 of a toothed wheel member such as shown in Figs. 10 and 11, is provided with radial bores 135, there being one such bore between each pair of adjacent cross bars or tooth members 132. Cooperating with these bores are removable cam members such as shown in Fig. 13, each cam member comprising a cam head 136 and a pin shank 137, the latter being preferably split as at 138 to provide substantial gripping action between the surfaces of said shank and the walls of a bore 135. By this means the number and/or position of the cams 136 may be varied as desired on any or all of the cam carrying wheels.

In Fig. 16 I provide additional means for modifying the movement of the wheel elements by variation of the cam contours. Here I show the toothed wheel element 140, constructed as suggested in Figs. 10 and 11, provided with a plate cam 139 secured to one face thereof. In utilizing this form of cam the wheel elements are made interchangeable so that it is only necessary to withdraw a shaft on which the wheel members are mounted, remove a given wheel and replace it with another having a different or modified cam contour. The modifications of my invention shown in Figs. 8 and 9 illustrate this particular form of interchangeable wheel elements at 103 and 118, respectively, but it is understood that the principle is applicable to any or all modifications shown. Thus, where the wheel element shown in Fig. 16 is designed to be driven by a pawl such as wheels 87 and 110 of Figs. 8 and 9, respectively, there may be superimposed upon the plate cam 139 a conventional ratchet wheel 149 and in instances wherein, as in Figs. 8 and 9, it is desirable to drive the wheel element 140 from an associated ratchet driven element, there may be secured to the opposite face a gear wheel 150. It is apparent, however, that the use of a plate like ratchet member 149 secured to the side of the cam plate 139, as shown in Figs. 8, 9, and 16 is not necessary since in any instances employing combined wheel and cam units as shown in Fig. 16, the driving pawls for these units may be arranged to operate directly upon the tooth portion defined by the cross bars 132.

In conclusion, it is to be noted that my invention is capable of application in many instances wherein a highly diversified relative movement of a plurality of elements is desired. By way of example, the invention finds utility in driving many forms of chance game devices, and advertising displays wherein different elements of a given display unit are required to be moved at different times and to different extents.

One striking example of the applicability of this invention is in cryptographic apparatus wherein it is necessary to relatively move or shift a plurality of code wheels and wherein it is highly desirable to provide a large number of variations in the relative movement and/or position of the respective wheels with regard to each other and with regard to the driver. As an illustration of this application of the present invention, I refer to my former Patent No. 1,953,829 issued April 10, 1934, wherein the invention here disclosed may be used with remarkably advantageous results to drive the code wheels shown particularly in Fig. 2 of said patent. As further illustrating this application of my invention I have shown in Figs. 8 and 9 one or more of the toothed wheel elements as provided with contact members 151 which, it will be understood, correspond to the contact members carried by the code wheel elements of my patent just referred to.

Attention is further directed to the fact that the means provided for rendering the movement of the driven toothed elements reversible is of primary importance in cryptographic work in that in case of error after a predetermined degree of advance movement of any or all of the wheels, the wheels may be returned to their original position by reversing the direction of operation of the several driving pawls and subsequently operating the driving lever through a corresponding number of cycles of operations.

It will be understood that the preferred modifications of my apparatus I have chosen to illustrate are but representative only of many possible forms thereof and that various modifications may be made in the illustrated arrangements without departing from the spirit of my invention which is characterized basically by an arrangement wherein a driving member moving regularly or uniformly through a given cycle may be caused to impart to a plurality of driven members intermittent irregular movements in accordance with predetermined or desired patterns. More particularly, the irregular movements of the driven members are controlled through one or more of the driven members by means which is effective to render certain of said members temporarily unresponsive to continued movement of the driver in response to predetermined movement of certain of said driven members.

Having thus described my invention, what I claim as new and desire to secure by Letters Patent is:

1. Motion converting and transmitting means comprising a pair of toothed wheel members mounted for rotation, pawl means operatively engaging the teeth of each wheel, pawl actuating means for imparting a power stroke to first one pawl and then the other to advance the wheel members step by step, and pawl control mechanism associated with one of said wheel members and effective in response to predetermined rotation thereof to render inoperative the driving pawl of the other wheel member.

2. Motion converting and transmitting means comprising a pair of toothed wheel members mounted for rotation, pawl means operatively engaging the teeth of each wheel, pawl actuating means for imparting a power stroke to first one pawl and then the other to advance the wheel members step by step, and pawl control mechanism associated with one of said wheel members, said mechanism including a cam member movable in response to the step by step movement of said one wheel and means engageable by said cam effective to disable the pawl of the other of said wheel members whereby to relatively modify the advance movement of said wheel members with respect to each other and with respect to the pawl actuating means.

3. Motion converting and transmitting means comprising a pair of toothed wheel members mounted for independent rotation, pawl means operatively engaging the teeth of each wheel, pawl actuating means for imparting a power stroke to first one pawl and then the other to advance the wheel members step by step, and pawl control means for each pawl effective to render the respective pawls temporarily inoperative to advance their respective wheel members, said pawl control means for each wheel including means for actuating the same in response to predetermined advance movement of the other wheel member.

4. Motion converting and transmitting means comprising a pair of toothed wheel members mounted for rotation, pawl means cooperating with the teeth of each wheel to advance the same step by step, means for imparting to said pawls alternate power and idle strokes in opposite directions, pawl throw-out mechanism for the pawl of one of said wheels and means operative during the idle stroke of said pawl for actuating said throw-out mechanism to render the pawl inoperative on a subsequent power stroke.

5. Motion converting and transmitting means comprising a pair of toothed wheel members mounted for rotation, pawl means cooperating with the teeth of each wheel to advance the same step by step, means for imparting to said pawls alternate power and idle strokes in opposite directions, pawl throw-out mechanism for the pawl of one of said wheels, and means for rendering said actuating means for the pawl throw-out mechanism operative in response to movement of the other wheel of said pair.

6. Motion converting and transmitting means comprising a pair of toothed wheel members mounted for rotation, pawl means cooperating with the teeth of each wheel to advance the same step by step, means for imparting to said pawls alternate power and idle strokes in opposite directions, pawl throw-out mechanism for the pawl of one of said wheels, and cam means movable in response to movement of the other wheel of said pair for actuating said pawl throw-out mechanism, said cam means being operative during the idle stroke of said pawl for rendering the pawl inoperative on a subsequent power stroke.

7. Motion converting and transmitting means comprising a pair of toothed wheel members mounted for rotation, pawl means cooperating with the teeth of each wheel to advance the same step by step, means for imparting to said pawls alternate power and idle strokes in opposite directions, pawl throw-out mechanism for the pawl of one of said wheels, cam means carried by the other wheel of said pair for actuating said pawl throw-out mechanism, and additional cam means driven by said other wheel, both of said cam means being operative during the idle stroke of said pawl for rendering the pawl inoperative on a subsequent power stroke.

8. Motion converting and transmitting means comprising a pair of toothed wheel members mounted for rotation, pawl means cooperating with the teeth of each wheel to advance the same step by step, means for imparting to said pawls alternate power and idle strokes in opposite directions, pawl throw-out mechanism for the pawl of one of said wheels, cam means carried by the other wheel of said pair, additional cam means driven by said other wheel, an actuating member for said pawl throw-out mechanism movable in response to engagement by either of said cam means, said actuating member operable during the idle stroke of said pawl for rendering the same inoperative during a subsequent power stroke thereof.

9. Motion converting and transmitting means comprising a pair of toothed wheel members mounted for rotation, pawl means cooperating with the teeth of each wheel to advance the same step by step, means for imparting to said pawls alternate power and idle strokes in opposite directions, pawl throw-out mechanism for the pawl of one of said wheels, cam means movable in response to movement of the other wheel of said pair for actuating said pawl throw-out mechanism and means for relatively shifting said cam means in respect to said other wheel for changing the time of engagement between said cam means and said throw-out mechanism.

10. Motion converting and transmitting means comprising a plurality of pairs of toothed wheel members mounted for rotation, pawl means associated with each wheel for driving the same step by step, means for actuating said pawls including a pivoted frame member to which all pawls are operatively connected, means for oscillating said frame about its pivot, selected pairs of said pawls being arranged to advance their respective wheels upon movement of said frame in one direction and other selected pairs of pawls being arranged to advance their respective wheels upon movement of the lever in the opposite direction, and pawl control mechanism for throwing selected pawls out of operative engagement with respect to their respective wheels, each of said pawl throw-out mechanisms being arranged for actuation by a wheel associated with a pawl of said first mentioned pair and to control the pawl of said second mentioned pair.

11. Motion converting and transmitting means comprising a plurality of toothed wheel members mounted for independent rotation, pawl means operatively engaging the teeth of each wheel, pawl actuating mechanism for intermittently advancing the wheel members step by step, and pawl control means for each pawl effective to render the respective pawls temporarily inoperative to advance their respective wheel members, said pawl control means for each wheel including cam means operatively associated with a wheel member other than the wheel advanced by the controlled pawl, said cam means being effective in response to advance movement of the wheels with which they are associated to actuate the respective pawls to inoperative position, there being provided cooperative means between the cam and wheel members whereby adjustment of the cams angularly with respect to the axis of rotation of the wheel members may be provided.

12. Motion converting and transmitting means comprising a plurality of toothed wheel members mounted for rotation, pawl means operatively engaging the teeth of each wheel, pawl actuating mechanism for imparting a power stroke to first one pawl and then the other to advance the wheel members step by step, and pawl throw-out means for each pawl effective to render the respective pawls temporarily inoperative to advance the respective wheel members, means to actuate the respective pawl throw-out means in response to determined advance movement of a wheel other than that with which the controlled pawl is associated, each of said actuating means including cam members associated with one of said wheel members, each of said cam members being selectively positionable upon any desired sector of the wheel member with which it is associated whereby to vary the time at which the pawl control mechanisms are operated.

13. Motion converting and transmitting means comprising a pair of toothed wheel members mounted for rotation, pawl means cooperating with the teeth of each wheel to advance the same step by step, means for imparting to said pawls alternate power and idle strokes in opposite directions, pawl throw-out mechanism for the pawl of one of said wheels and means operative in response to a power impulse delivered to the other of said wheels for actuating said throw-out mechanism during the idle stroke of said one pawl to render said pawl inoperative on a subsequent power stroke thereof.

14. Motion converting and transmitting means comprising a plurality of toothed wheel members mounted for rotation, pawl means cooperating with the teeth of each wheel to advance the same step by step, means for imparting to said pawls alternate power and idle strokes in opposite directions, pawl control means associated with each pawl, and means to actuate each of said pawl control means to move the respective pawls to inoperative position in response to movement of a wheel associated with a pawl other than said controlled pawl.

15. Motion converting and transmitting means comprising a plurality of toothed wheel members mounted for rotation, pawl means cooperating with the teeth of each wheel to advance the same step by step, means for imparting to said pawls alternate power and idle strokes in opposite directions, pawl control means associated with each pawl effective to render the respective pawls temporarily inoperative to advance their respective wheel members, each of said pawl control means being arranged for actuation by a wheel associated with a pawl other than said controlled pawl, and including a cam associated with said last-mentioned wheel, the wheel and cam being provided with cooperative means for selectively positioning said cam in any desired sector of the wheel.

16. Motion converting and transmitting means comprising a plurality of toothed wheel members mounted for rotation, pawl means cooperating with the teeth of each wheel to advance the same step by step, means for imparting to said pawls alternate power and idle strokes in opposite directions, pawl control means associated with each pawl effective to selectively position the respective pawls in operative or inoperative relation to their respective wheel members, each of said wheel members being provided with means for actuating a pawl control means, the pawl control means for one of said pawls being actuated by a wheel other than that with which the said pawl is associated and the pawl control means for the pawl of said last-mentioned wheel being in turn controlled by the wheel the pawl control of which is actuated by said last-mentioned wheel.

17. Motion converting and transmitting means comprising a plurality of toothed wheel members mounted for rotation, pawl means cooperating with the teeth of each wheel to advance the same step by step, means for imparting to said pawls alternate power and idle strokes in opposite directions, pawl control means associated with each pawl effective to render the respective pawls temporarily inoperative to advance their respective wheel members, each of said wheel members being provided with means for actuating a pawl control means associated with the pawl operatively engaging the teeth of a second wheel, and said second wheel actuating the pawl control means associated with the pawl operatively engaging the teeth of a third wheel, and so on in like manner until the last of any number of wheels utilized actuates the pawl control means associated with the pawl operatively engaging the teeth of said first mentioned wheel whereby the intermittent step by step rotation of each wheel in conjunction with the cam carried thereby actuates the pawl control means associated with the pawl operatively engaging the teeth of a different wheel to cause the latter to rotate in a variable intermittent manner.

ROY K. MORRIS.